W. H. COBB.
BELT CLAMP.
APPLICATION FILED SEPT. 12, 1914.
1,235,656.
Patented Aug. 7, 1917.
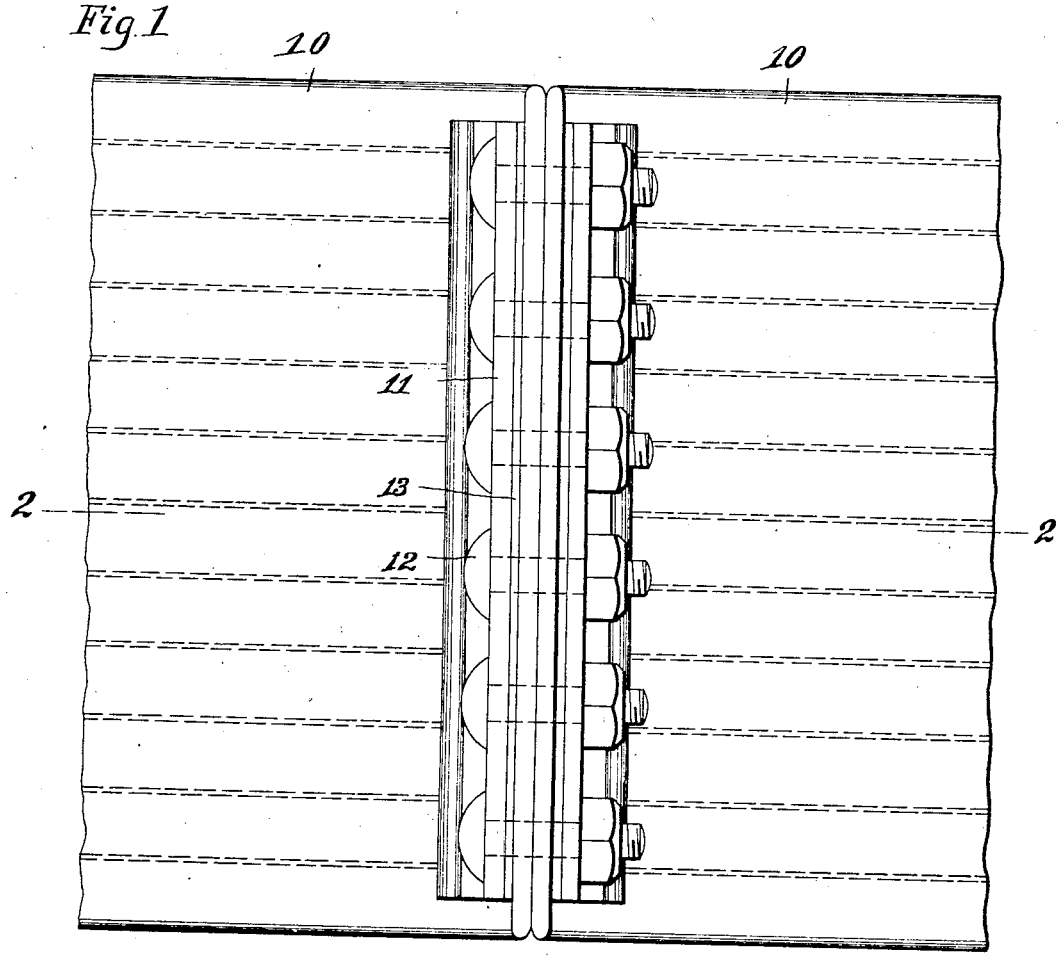
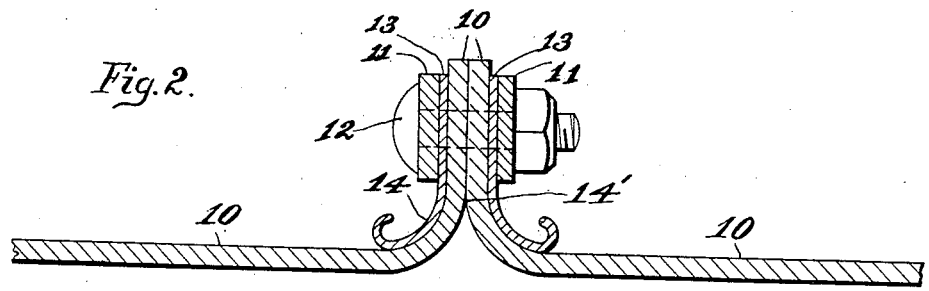
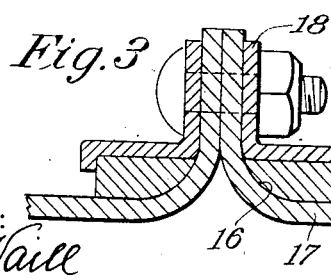
Willard H. Cobb.
Inventor
By his Attorney
Ernest Hopkinson
Witnesses:
Edw. W. Vaill
Francis Boyle

UNITED STATES PATENT OFFICE.

WILLARD H. COBB, OF BABYLON, NEW YORK, ASSIGNOR TO NEW YORK BELTING & PACKING COMPANY, A CORPORATION OF NEW YORK.

BELT-CLAMP.

1,235,656.  Specification of Letters Patent.  Patented Aug. 7, 1917.

Application filed September 12, 1914. Serial No. 861,359.

*To all whom it may concern:*

Be it known that I, WILLARD H. COBB, a citizen of the United States, residing in Babylon, county of Suffolk, State of New York, have invented certain new and useful Improvements in Belt-Clamps, of which the following is a full, clear, and exact description.

This invention relates to belt clamps and has for an object to provide a clamp for joining the ends of flexible belting, such as leather, rubber, balata, canvas and the like in such a manner as to transmit power for constant or varying loads without increased stretch or slack in the belt, or damage to said ends.

In the ordinary construction of belt clamp, the ends of the belt are carried outwardly at right angles to the longitudinal line of the belt and there confined between two rigid clamp plates by bolts passed through the plates. As a result of this construction, the belt is strained and mutilated by being pulled at right angles to itself against the sharp edges of the clamp plates and is thereby weakened to withstand service conditions. The present invention obviates this disadvantage by the provision of novel guard-plates underneath the clamp plates which relieve the belt from shocks incident to variable loads and provide means for obtaining a more constant tension than hitherto obtainable, while at the same time allowing the belt to take an easy bend without damage.

The invention will be readily understood as to the accompanying drawing, in which Figure 1 is a plan view showing the application of the invention to a belt;

Fig. 2 is a cross-sectional view on the line 2—2, Fig. 1.

Fig. 3 is a sectional view of a modified form of the invention.

Referring now to the drawings, 10 indicates the ends of a flexible belt of rubber, leather, balata, canvas or the like, the same being directed outwardly at right angles to the longitudinal line of the belt, as shown in Fig. 2, and there confined together between parallel transversely disposed clamp plates 11, through which and the ends, bolts 12 are passed.

In carrying out the invention, a guard plate 13 is inserted between each clamp plate 11 and a corresponding end of the belt, these guard plates being secured in place through the instrumentality of the above mentioned bolts which pass through registering openings in the clamp plates and in the guard plates. Each guard plate is curved outwardly at its free end, as shown at 14, thereby presenting a curved face to the outer surface of the belt near the junction line 14′ of the clamped ends, to provide against mutilation of the belt when flexing in passing over the pulley, or under other service conditions. Each guard plate is preferably formed of resilient material and receives the tension of and yields with the belt. The area of the guard plates and their capacity for yielding are regulated to meet service conditions and permit of the belt taking an easy bend in passing over the pulleys without increased stretch or slack to the belt, this yielding capacity furthermore relieving the belt from shocks and jars incident to variable loads and providing means for obtaining a constant tension not heretofore obtainable.

Each guard plate may be formed of rigid material 15 provided with a rounded face 16 that bears against the belt 17, and each clamp plate 18 may be fashioned to anchor the guard plate in place in any preferred manner, as for instance, by bending the end 19 down over the clamp plate.

The guard plates may be formed integral with or separate from the clamp plates. Also each guard plate may be formed of a single piece of resilient material, or of rigid material provided with a resilent free portion, it being simply necessary to the practice of the invention that curved parts project from the clamping members to yieldingly receive the tension of and prevent mutilation of the belt under service conditions.

What I claim and desire to have protected by Letters Patent is:

1. A belt clamp comprising oppositely disposed resilient plates adapted for receiving between them outwardly turned ends of a belt, said plates having oppositely disposed flaring edges adapting them to yieldingly support the ends of the belt at the bends thereof, rigid plates at the opposite edges and adjacent exteriorly of the first plates for limiting resilient areas of said first plates, and locking bolts extending through the plates.

2. A belt clamp having oppositely disposed flaring portions adapting them to yieldingly support the ends of a belt at the bends thereof, the ends adjacent the flaring portions being turned backwardly, rigid plates at the opposite edges and adjacent exteriorly of the first plates for limiting resilient areas of said first plates, and locking bolts extending through the plates.

Signed at New York, county of New York, State of New York, this 25th day of August, 1914.

WILLARD H. COBB.

Witnesses:
GEORGE A. SMITH,
W. F. DE BOVES.